March 17, 1936.  M. J. ANDERSON  2,034,322
CUSPIDOR
Filed May 17, 1935  2 Sheets-Sheet 1
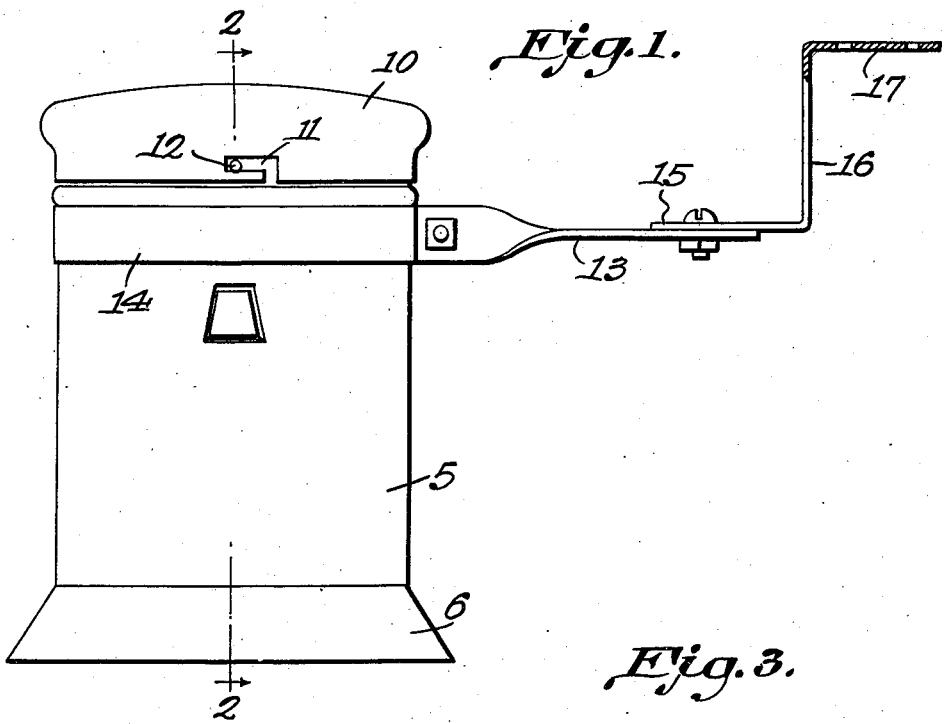
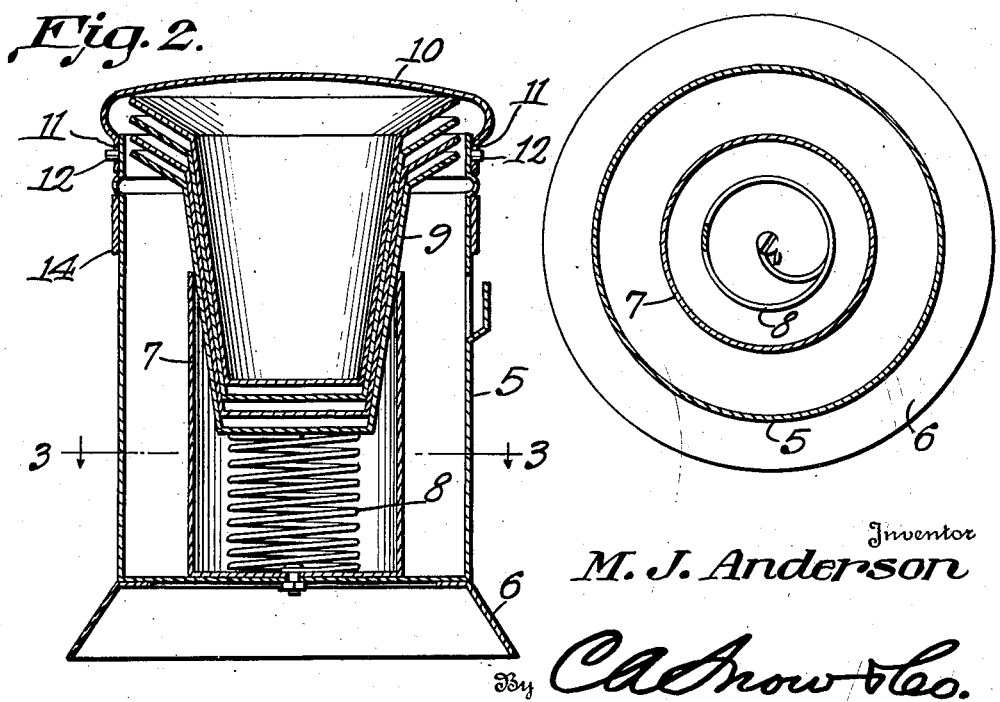
Inventor
M. J. Anderson
By C. A. Snow & Co.
Attorneys March 17, 1936.                M. J. ANDERSON                2,034,322
                                  CUSPIDOR
                              Filed May 17, 1935            2 Sheets-Sheet 2
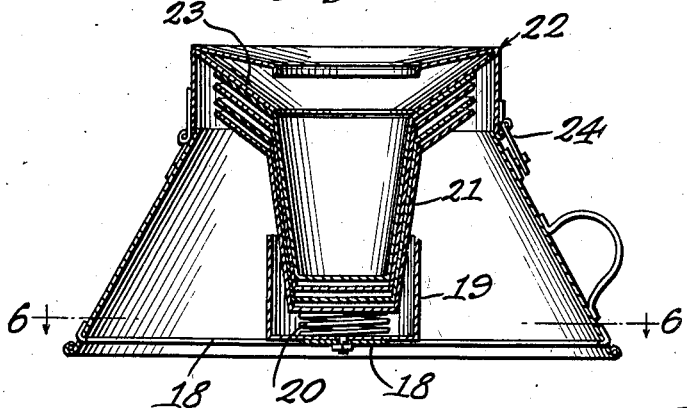
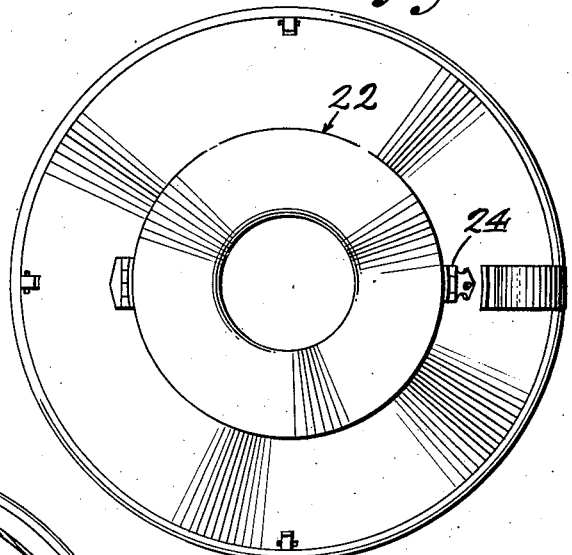
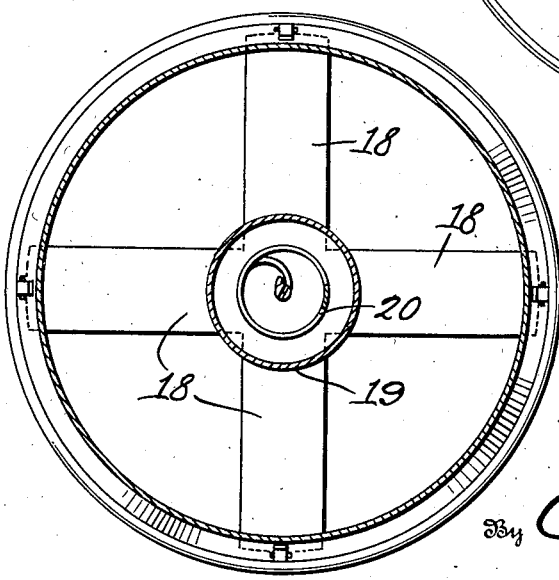
Inventor
M. J. Anderson
By CA Snow & Co.
Attorneys Patented Mar. 17, 1936

2,034,322

UNITED STATES PATENT OFFICE 2,034,322

CUSPIDOR

Milton J. Anderson, Warren, Ind.

Application May 17, 1935, Serial No. 22,065

1 Claim. (Cl. 4—285)

This invention relates to cuspidor construction, and more particularly to cuspidors designed for use in motor vehicles or in public places, such as hotels, stores, restaurants or the like.

An important object of the invention is to provide a device of this character which may be mounted on a motor vehicle at a point under the instrument board thereof, whereupon the body portion may be moved from a concealed position, to a position where the occupants of the car may have easy access thereto.

Another object of the invention is the provision of a cuspidor including a body portion having means for supporting sputum cups therein, in such a way that the uppermost cup may be removed, exposing a clean cup, and providing an exceptionally sanitary cuspidor, and one which may be cleaned readily.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is an elevational view of a cuspidor designed for positioning under the instrument board of a motor vehicle, or other support.

Figure 2 is a sectional view taken on line 2—2 of Figure 1.

Figure 3 is a sectional view taken on line 3—3 of Figure 2.

Figure 4 is a vertical sectional view through a modified form of the invention.

Figure 5 is a plan view of the cuspidor.

Figure 6 is a sectional view taken on line 6—6 of Figure 4.

Referring to the drawings in detail, the cuspidor as shown by Figure 1 of the drawings, is designed primarily for use in motor vehicles, however it is to be understood that this form of cuspidor may be supported under any desirable supporting member, such as a shelf or the like.

The reference character 5 designates the body portion of the cuspidor which has a flared lower extremity 6 providing a support for the cuspidor when it is positioned on a supporting surface.

Mounted within the body portion 5 is a container indicated by the reference character 7, the container being substantially tubular in formation, and secured within the body portion 5 by a securing means which is shown in the present drawings, as extended through the bottom of the body portion 5.

Within the container 7 is a coiled spring indicated at 8 which normally acts to move the sputum cups, which are indicated by the reference character 9, upwardly against the cover 10, to prevent movement of the cups within the body portion when the cuspidor is supported under the instrument board of a motor vehicle.

The sputum cups 9 are preferably formed of paper material so that they may be destroyed when it is desired to replace a cup.

The cover 10 is formed with bayonet slots 11 which are adapted to accommodate the pins 12 that extend laterally from the body portion, the spring 8 acting to move the cups into engagement with the top or cover 10 making it necessary to press downwardly on the cups in order to bring the cover to its proper locked position over the pins 12. When it is desired to use the device, the cover 10 is removed, exposing the uppermost cup. After use the cover may be replaced, forcing the cups against the action of the spring 8, and securely gripping the cups between the spring and cover holding the cups against movement due to vibrations of the vehicle.

In order that the device may be readily positioned on a supporting surface, an arm indicated at 13 is provided, which arm is formed with a ring member 14 at one end thereof, which ring member embraces the body portion 5, gripping the body portion 5 supporting the body portion.

The arm 13 is twisted so that the free end thereof has its side faces disposed in a horizontal plane, to be engaged by the end 15 of the bracket 16, which bracket has a right angled extremity 17 formed with openings to receive securing screws.

In the form of the invention as illustrated by sheet 2 of the drawings, the body portion which is designed to be positioned on the floor, is flared providing a wide supporting surface. Within the top portion are cross members 18, that provide a support for the circular member 19 in which the coiled spring 20 is held, the coiled spring providing a rest for the sputum cups indicated by the reference character 21. The body portion in this form of the invention, is substantially frusto conical in formation and is supplied with a cover 22 of a diameter to fit over the upper end of the body portion, when the cover is in a closed position.

Extending inwardly from the cover are spaced flanges 23 that slope downwardly towards the sputum cups supported within the body portion.

Due to the construction of the flanges 23, it will be seen that the flanges fit closely within the upper end of the uppermost sputum cup, holding the cup in position directly under the opening of the cover.

A fastener indicated at 24 is provided on the cover and acts to hold the cover in its closed position, and it will be seen that when the cover is in its closed position, the cups 9 are held in their upright or receiving positions.

When it is desired to clean this form of cuspidor, it is only necessary to lift the cover and remove the uppermost cup. A clean cup is now exposed for use and the cover may then be returned to its closed position.

Having thus described the invention, what is claimed is:

A cuspidor comprising a body portion, a tubular container secured to the bottom of the body portion, the upper end of the container terminating at a point an appreciable distance below the upper edge of the body portion, a coiled spring within the container, said container adapted to receive inverted cone shaped cups, said spring engaging the lowermost cup and adapted to exert slight upward pressure on the cups, a removable cover for the body portion and against which the uppermost cup engages, and a bracket secured to the body portion for securing the body portion to a support.

MILTON J. ANDERSON.